United States Patent [19]
Sato et al.

[11] Patent Number: 6,035,134
[45] Date of Patent: Mar. 7, 2000

[54] LENS BARREL HAVING IMAGE STABILIZING FUNCTION

[75] Inventors: Shigeki Sato, Yokohama; Shinji Imada, Kawasaki; Hiroyuki Kimura, Tanashi; Takashi Watanabe, Fuchu, all of Japan

[73] Assignee: Canon Kabushiki Kaisha, Tokyo, Japan

[21] Appl. No.: 09/018,049

[22] Filed: Feb. 3, 1998

[30]  Foreign Application Priority Data

Feb. 7, 1997  [JP]  Japan .................................. 9-040013

[51] Int. Cl.[7] .................................................. B03B 39/00
[52] U.S. Cl. .............................................. 396/55; 348/208
[58] Field of Search ................................. 396/52, 53, 54, 396/55; 348/208

[56] References Cited

U.S. PATENT DOCUMENTS

| | | | |
|---|---|---|---|
| 5,194,888 | 3/1993 | Akashi et al. .............................. | 396/54 |
| 5,231,445 | 7/1993 | Onuki et al. ............................... | 396/55 |
| 5,337,098 | 8/1994 | Imafuji et al. ............................. | 396/55 |
| 5,576,787 | 11/1996 | Kai et al. .................................. | 396/55 |
| 5,615,397 | 3/1997 | Shiomi et al. ............................. | 396/55 |
| 5,745,799 | 4/1998 | Morofuji ................................... | 396/55 |
| 5,752,091 | 5/1998 | Kai et al. .................................. | 396/52 |
| 5,815,742 | 9/1998 | Hamada et al. ........................... | 396/55 |

FOREIGN PATENT DOCUMENTS

| | | |
|---|---|---|
| 3-188430 | 8/1991 | Japan . |
| 6-28409 | 4/1994 | Japan . |
| 6-36571 | 5/1994 | Japan . |

*Primary Examiner*—Russell Adams
*Attorney, Agent, or Firm*—Fitzpatrick, Cella, Harper & Scinto

[57] ABSTRACT

A lens barrel having an image stabilizing function includes a vibration detecting part for detecting a vibration, a lens unit for correcting an image shake by changing an optical path according to a detection signal produced by the vibration detecting part, a driving circuit for driving the lens unit, the driving circuit having a plurality of driving control modes, a setting switch for setting one of the driving control modes, and an operation member for causing the driving circuit to start and stop driving the lens unit, wherein the setting switch and the operation member are arranged separately from each other and are slidable in an optical axis direction.

10 Claims, 7 Drawing Sheets

LENS BARREL HAVING IMAGE STABILIZING FUNCTION

BACKGROUND OF THE INVENTION

1. Field of the Invention

The present invention relates to a lens barrel having an image-shake correction optical means arranged, for example, to detect vibrations occurring in the lens barrel as information to be used for preventing image shake and to cause the image shake to be suppressed by moving the image-shake correction optical means in a direction perpendicular to the optical axis of the lens barrel.

2. Description of Related Art

Conventional cameras are arranged to automatically carry out all important actions, such as exposure control and focus auto-control, so that even a person unaccustomed to operating cameras can take pictures with little risk of failure. Further, a system for correcting image shake by detecting vibrations applied to the camera has recently been developed as disclosed, for example, in Japanese Laid-Open Patent Application No. HEI 3-188430.

The frequency of vibrations applied to the camera from the hands holding the camera in taking a picture is normally within a range from 1 Hz to 12 Hz. In order to take a picture without image shake despite occurrence of such vibrations at the time of a shutter release, it is necessary to detect the vibrations of the camera caused by the hands holding the camera and to correct any changes taking place in the direction of an optical axis with a correction optical means according to the amount of the vibrations detected.

The vibration detecting action can be carried out theoretically by providing a camera or a lens unit with a vibration detecting means for detecting an angular acceleration, an angular velocity, an angular displacement, etc., and an image-shake detecting means for electrically or mechanically integrating a signal output from the vibration detecting means and for outputting a signal indicating an angular displacement as detection information. Then, an image-shake suppressing action can be carried out by driving, according to the detection information, a correction optical means which is arranged to decenter a photo-taking optical axis.

Figure 6:
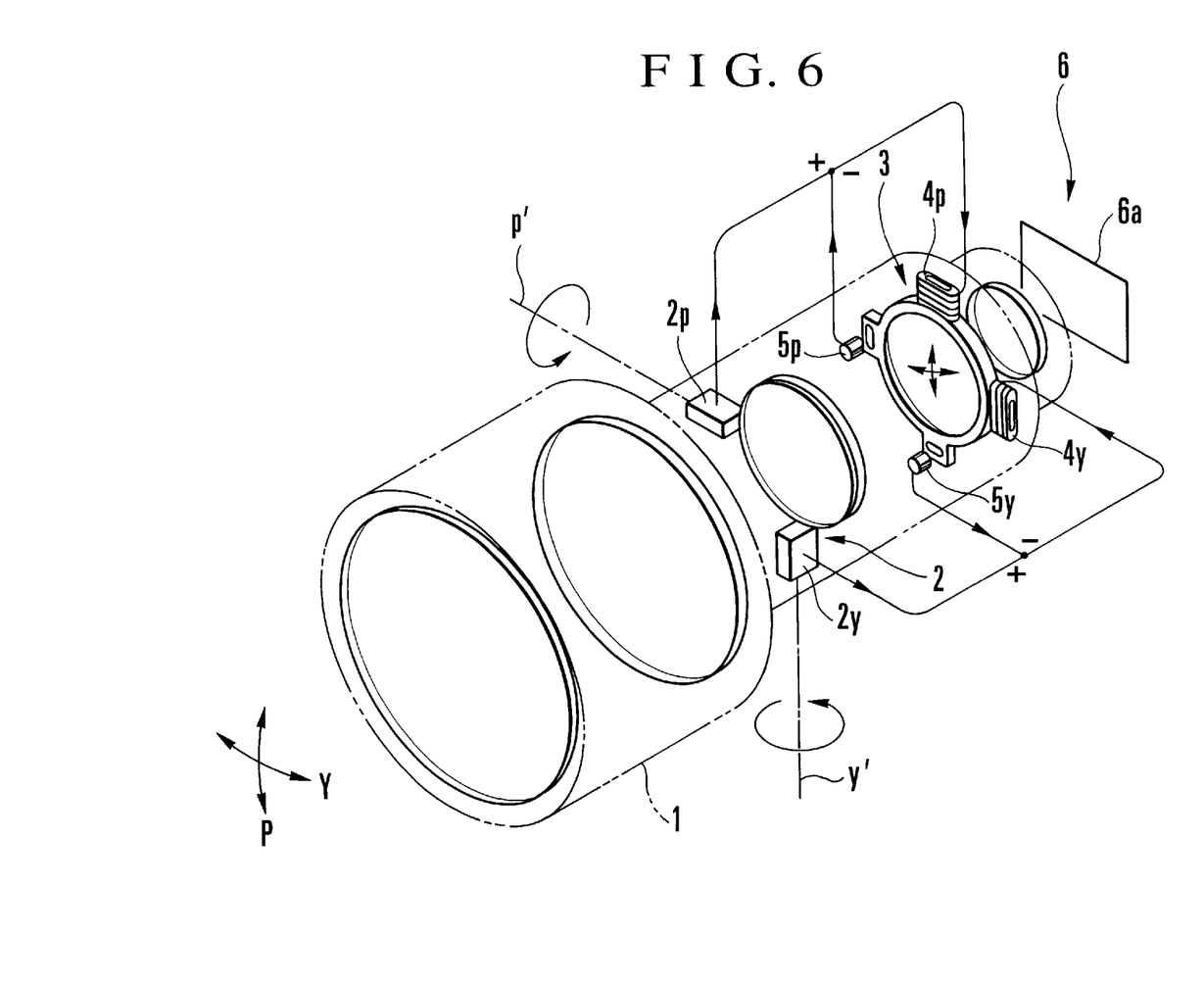
FIG. 6 is a perspective view showing the arrangement of the conventional image-shake correction optical means.

FIG. 6 is a perspective view showing an image stabilizing system using the vibration detecting means. Referring to FIG. 6, a vibration detecting means 2 and a correction optical means 3 are disposed between lens units inside a lens barrel 1, so as to constitute the image stabilizing system for suppressing image shake caused by vibrations in the directions of two arrows P and Y, i.e., vertical (pitching) vibrations of the camera and horizontal (yawing) vibrations of the camera.

The vibration detecting means 2 is composed of a detecting means 2p for detecting vertical vibrations of the camera indicated by a line p' and a detecting means 2y for detecting horizontal vibrations of the camera indicated by a line y'. The correction optical means 3 is provided with coils 4p and 4y which are arranged to give thrusts, and detecting elements 5p and 5y which are arranged to detect the positions of the correction optical means 3. The correction optical means 3 is further provided with a position control loop, which is arranged to drive and move the correction optical means 3 by using the output of the vibration detecting means 2 as a target value in such a way as to reliably stabilize an image obtained on the image surface 6a of a film 6.

In the case of a video camera disclosed in Japanese Patent Publication No. HEI 6-28409, the correction optical means 3 which is rotatably supported is arranged to be controlled either in a mode of following up panning or in a mode of not following up panning. The video camera is provided with a change-over switch for selecting the panning follow-up mode or the panning non-follow-up mode. The change-over switch and a recording switch are arranged within one and the same switch means. Further, a photo-taking device disclosed in Japanese Patent Publication No. HIE 6-36571 also has the correction optical means 3 rotatably supported therein. In the photo-taking device, a switch is provided for selection between an image stabilizing photo-taking mode and a panning photo-taking mode. In the panning photo-taking mode, the correction optical means 3 is arranged to have a displacement gain increased to be larger by at least two times the displacement gain in the image stabilizing photo-taking mode.

In each of the conventional examples mentioned above, however, if the image-shake correcting action is arranged to be carried out in an unequivocal and fixed manner, in a case where the lens barrel is intentionally moved by the operator, for example, in performing panning or in following up a finely moving object of shooting, this operation is detected and mistaken for vibrations. In such a case, the lens barrel would come to erroneously carry out a driving action for image-shake correction. As a result, an image as viewed on a viewfinder tends to sway backward in a manner called a "backward shake". With the backward shake having occurred, if the operator attempts to move the lens barrel to correct it, such an attempt would bring about another backward shake, which makes it extremely difficult to follow up the object. Further, while an automatic focusing action on the lens is in process, such a backward shake frequently brings the object out of a focusing frame, thereby bringing the lens barrel into a defocusing state. Then, a shutter operating opportunity tends to be missed under such a condition.

To solve the above-stated problem, in the video camera disclosed in Japanese Patent Publication No. HEI 6-28409, the recording switch is arranged to serve also as a change-over switch for selection between the panning follow-up mode and the panning non-follow-up mode. In carrying out the control mode change-over, however, the recording switch might be completely turned off by mistake. Further, the image stabilizing characteristic of the video camera is hardly satisfactory for a normal shooting operation in the non-follow-up mode. Therefore, the quality of images obtained by shooting after panning becomes inadequate. The same problems exist also in the photo-taking device disclosed in Japanese Patent Publication No. HEI 6-36571 mentioned above.

Further, in a case where the lens barrel having the image-shake correction optical means is secured to a tripod, the operation of the shutter might cause vibrations of high frequency in the direction of pitching. The frequency component of the ordinary driving signal for image-shake correction differs too much from the high frequency of the vibrations to adequately correct the image shakes. To solve this problem, therefore, a switch for the image-shake correction must be turned off for a shooting operation in that case.

BRIEF SUMMARY OF THE INVENTION

It is an object of the invention to provide a lens barrel having an image-shake correction optical means, which is arranged to enable the operator to select a mode of image-shake correction control as desired by the operator, so that the range of photo-taking opportunities can be broadened.

It is another object of the invention to provide a lens barrel having an image-shake correction optical means, in which two operation members for control over an image-shake correcting operation are provided to be operated in one and the same direction, so that the lens barrel can be easily operated without any possibility of erroneous operation and without any disagreeable feeling of operation.

It is a further object of the invention to provide a lens barrel having an image-shake correction optical means, which enables the operator to select a mode in which a backward shake of image becomes less conspicuous even in the event of panning.

It is a still further object of the invention to provide a lens barrel having an image-shake correction optical means, which is arranged to correct image shake only in the direction of yawing and to correct image shake in the direction of pitching only when the image shake in the direction of pitching results from a shock caused by a shutter operation while a shutter release is in progress, so that a picture can be taken without any image shake.

To attain these objects, in accordance with one aspect of the invention, there is provided a lens barrel having an image stabilizing function, which comprises vibration detecting means for detecting a vibration, optical means for correcting an image shake by changing an optical path according to a detection signal produced by the vibration detecting means, driving means for driving the optical means, the driving means having a plurality of driving control modes, setting means for setting one of the driving control modes, and an operation member for causing the driving means to start and stop driving the optical means, wherein the setting means and the operation member are arranged separately from each other and are slidable in an optical axis direction.

The above and other objects and features of the invention will become apparent from the following detailed description of an embodiment thereof taken in conjunction with the accompanying drawings.

DETAILED DESCRIPTION OF THE INVENTION

Hereinafter, a preferred embodiment of the invention will be described in detail with reference to the drawings.

Figures 1, 1A:
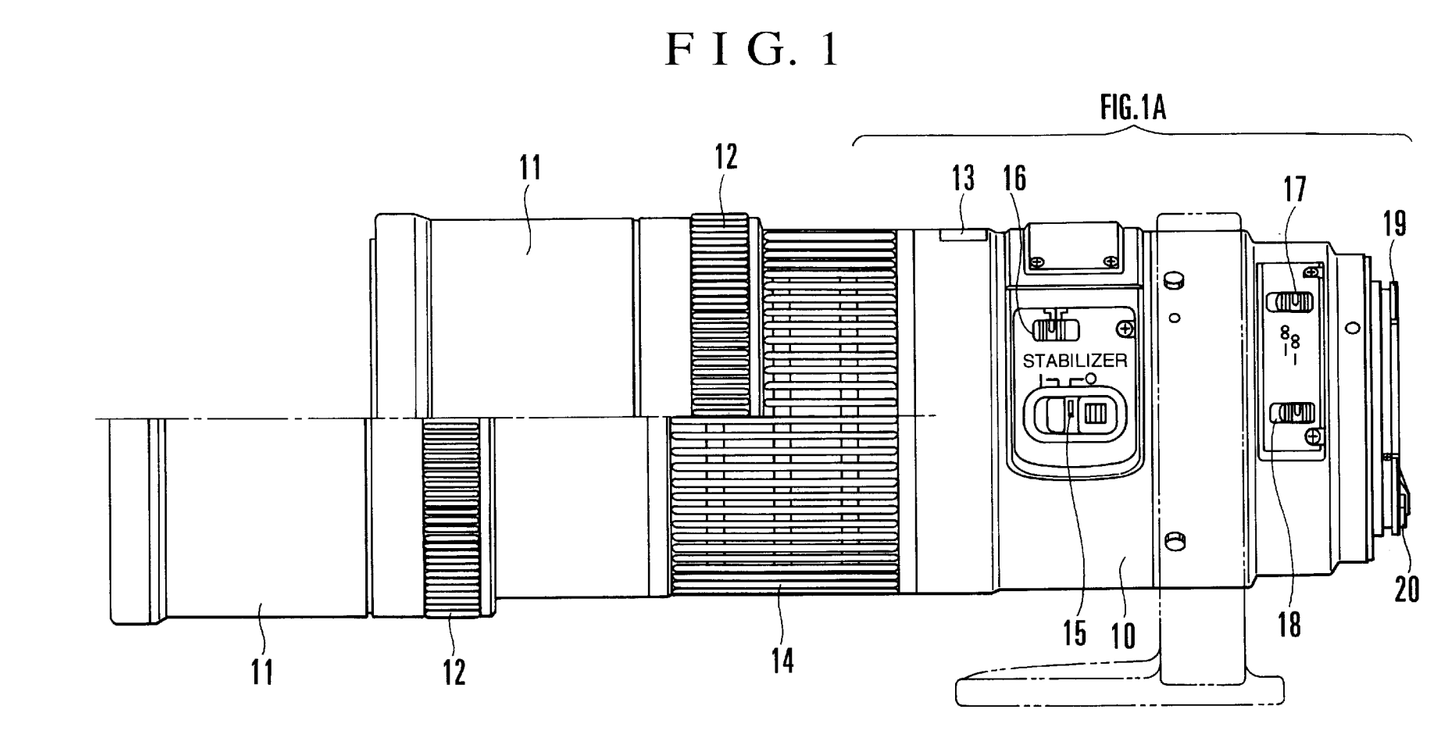
FIG. 1 is a side view showing a lens barrel according to an embodiment of the invention.
FIG. 1A is an enlarged side view showing a part of the lens barrel shown in FIG. 1.
Figure 1A:
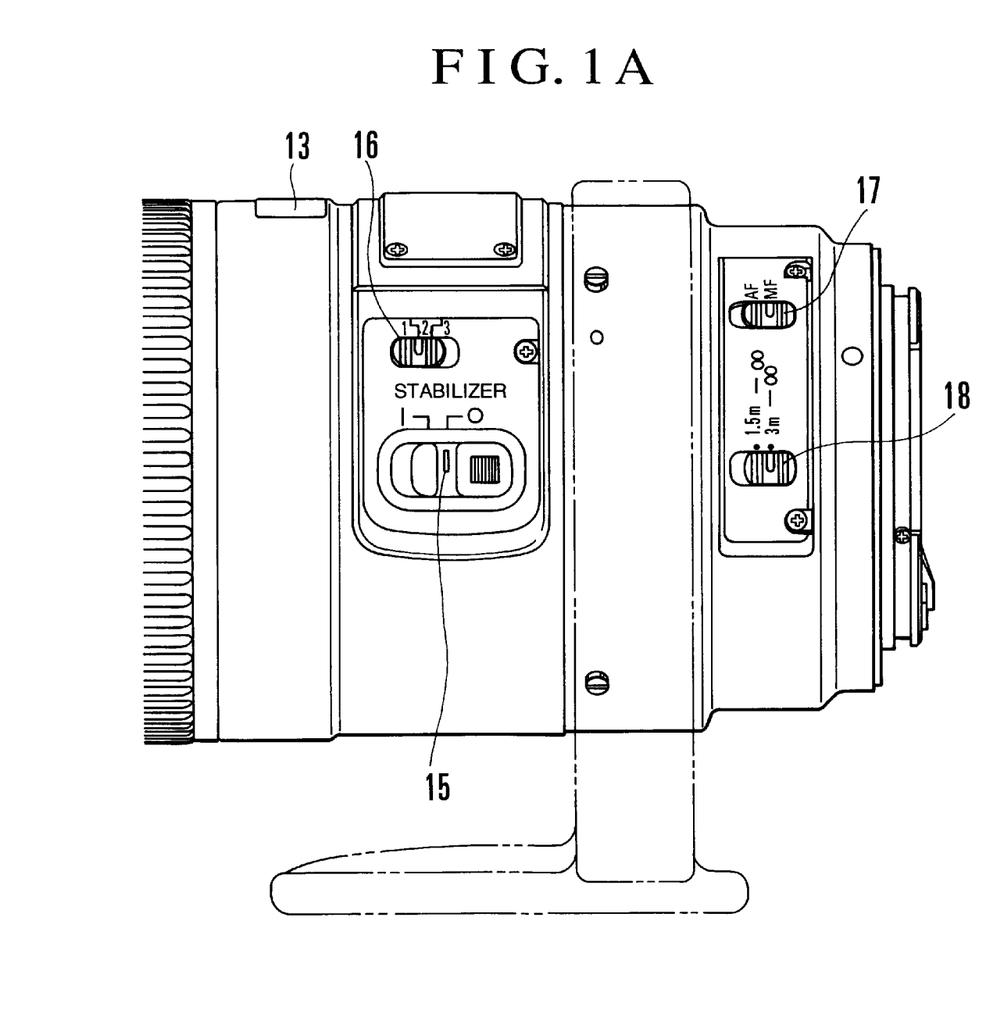

FIG. 1 is a side view showing a telephoto lens barrel arranged for a single-lens reflex camera, according to the embodiment of the invention. The lens barrel, which is removably attachable to the body of the camera, includes a fixed tube 10. A built-in hood 11 is fitted on the front part of the fixed tube 10. In a case where light might harmfully enter the lens barrel, the built-in hood 11 can be drawn out forward to block the light, as illustrated on the lower side of a center line indicated in FIG. 1. The built-in hood 11 is provided with a rubber ring 12 which is arranged to facilitate turning the hood 11 by hand and also with a lock mechanism which is arranged to lock the hood 11 in its drawn-out position when the hood 11 is turned around the optical axis after it is drawn out in the optical axis direction.

A scale window 13 which is formed with a transparent member in an upper part of the fixed tube 10 is arranged to make the position of a focusing lens visible. The fixed tube 10 is provided with a manual ring 14 which is rotatable by hand. In the middle part of the fixed tube 10, there are disposed a first operation means 15 which is an image-shake correction switch to output ON and OFF signals for an image-shake correcting action and a second operation means 16 which is an image-shake correction control change-over switch to change over the control mode for the image-shake correcting action. In the rear of the first and second operation means 15 and 16, there are disposed an AF/MF (automatic focusing/manual focusing) change-over switch 17 and a distance limiter 18 which is arranged to permit selection of a range of moving a lens unit L3 (FIG. 2) for a focusing action. In a connection part provided in the rear of the lens barrel for connection with the camera body, there are disposed a mount 19 and an electric contact block 20. The mount 19 is composed of a bayonet structure arranged to be connected to the body of the single-lens reflex camera (camera body). The electric contact block 20 is arranged to transmit and receive electric signals to and from a CPU, etc., disposed within the camera body.

Figure 2:
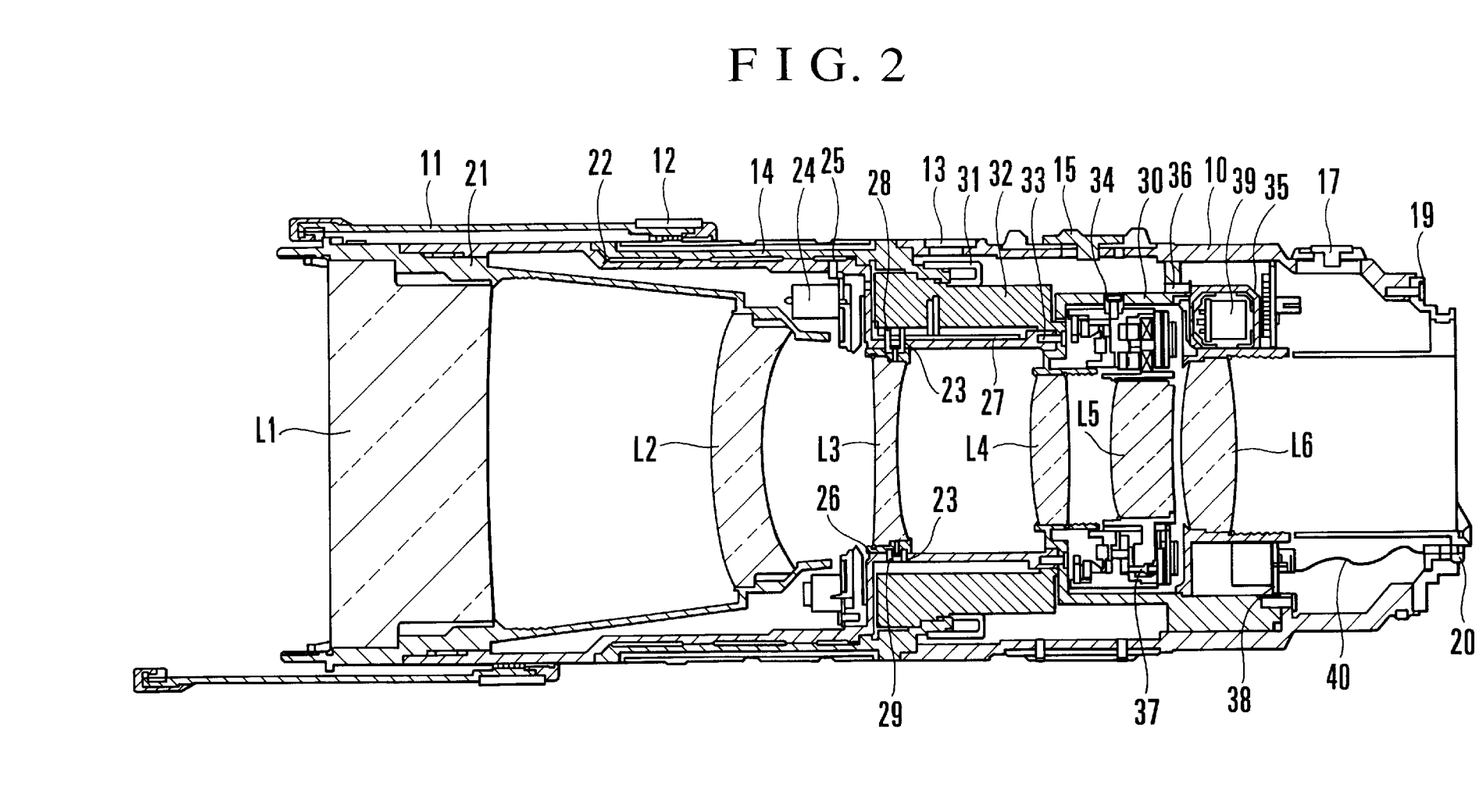
FIG. 2 is a sectional view of the lens barrel shown in FIG. 1.

FIG. 2 is a sectional view of the lens barrel shown in FIG. 1 with a part of the lens barrel omitted from the illustration. A total of six lens units, i.e., first to sixth lens units L1 to L6, are disposed within the lens barrel. Of these lens units, the first, second, fourth and sixth lens units L1, L2, L4 and L6 are fixed lens units. The third lens unit L3 is a focus adjusting (focusing) lens unit which is arranged to be movable in the optical axis direction. The fifth lens unit L5 is a correction lens unit, i.e., a shift lens unit, which is arranged to be movable in a direction perpendicular to the optical axis.

The first and second lens units L1 and L2 are supported by a front lens unit tube 21. The front lens unit tube 21 is fixed to a guide tube 22. The guide tube 22 is provided with three cams 23 for focus adjustment, and a diaphragm unit 24 is fixed to the guide tube 22 with screws 25.

The third lens unit L3 which is provided for focus adjustment (focusing) is fixed to a moving tube 26. For causing the third lens unit L3 to be moved back and forth in the optical axis direction, a focus roller 28 which is fixedly connected to the moving tube 26 is slidably fitted on a focus key 27. In addition to that, the focus roller 28 is slidably fitted in one of the three focus cams 23 which are provided on the guide tube 22. Further, rollers 29 are slidably fitted in two of the three focus cams 23 other than the cam in which the focus roller 28 is fitted.

The guide tube 22 is connected to and supported by the fixed tube 10 through a joining tube 30. A distance scale 31 is arranged to rotate around the optical axis according to the rotation of the focus key 27 and to permit confirmation of distances through the scale window 13 which is provided in the fixed tube 10. Further, an actuator unit 32 is fixed to the guide tube 22 with screws 33.

The fourth lens unit L4 is held by a front end leg part of the joining tube 30. The joining tube 30 is provided with a hole in which a roller 34 is disposed. The joining tube 30 is further provided with a fitting engagement face which is arranged on the rear side of the hole to engage a holding tube 35, which is arranged to hold the sixth lens unit L6. The joining tube 30 and the holding tube 35 are thus connected to each other by means of a screw 36. The joining tube 30 also supports an image-shake correction optical means 37 through the roller 34. The image-shake correction optical means 37 is arranged to correct image shake by driving the fifth lens unit L5 which is provided for correction to cause the fifth lens unit L5 to move in a direction perpendicular to the optical axis. Further, three rollers 34 are arranged on a circumference of the joining tube 30. Two of the three rollers 34 have their shafts arranged eccentrically. The eccentric shafts of these rollers 34 are fitted respectively into the joining tube 30 and the image-shake correction optical means 37. The image-shake correction optical means 37 is arranged to permit optical adjustment as desired by tilting the image-shake correction optical means 37.

The first operation means 15 and the second operation means 16 are disposed on the fixed tube 10. The second operation means 16 is formed in a less protruding shape to prevent it from being inadvertently operated and is smaller in size than the first operation means 15. The operating direction of each of the first operation means 15 and the second operation means 16 is set to be in parallel with the optical axis, so that the operation position thereof can be easily confirmed. The AF/MF change-over (selection) switch 17, the distance limiter 18, the mount 19 and the electric contact block 20 are also disposed on the fixed tube 10.

A circuit mounting board 38 is arranged inside of the fixed tube 10 to be connected to a driving part of the diaphragm unit 24, a vibration detecting means 39, the actuator unit 32, the image-shake correction optical means 37, and a flexible circuit board which will be described later. Further, some elements such as ICs or the like are arranged on the circuit mounting board 38 and are connected to the electric contact block 20 by means of a lead wire 40.

When the AF/MF change-over switch 17 is set to AF (automatic focusing), the actuator unit 32 is driven in accordance with a focusing signal coming from the camera body. Then, the focus key 27 is rotated by the actuator unit 32 accordingly. When the AF/MF change-over switch 17 is set to MF (manual focusing), the focus key 27 is caused to rotate through a differential gear included in the actuator unit 32 by turning the manual ring 14 by hand so as to adjust focus in the same manner as in the case of AF.

In performing an image-shake correcting action with the fifth lens unit L5, the first operation means 15 is operated (turned on) by the operator to move toward an object side in a direction parallel with the optical axis. When the fifth lens unit L5 is to be used as an ordinary lens, the first operation means 15 is kept on or moved (turned off) toward a film surface side in parallel with the optical axis. Further, when the first operation means 15 is in the on-state, the second operation means 16 can be operated to control an image-shake correction driving action in one of the following three different modes, which are arranged to be switchable from one over to another (see FIG. 1A).

In the case of the present embodiment, the first mode is an ordinary mode of control over image-shake correction driving with importance set on the follow-up of low-frequency shake in particular. The second mode is a mode of control suited for a case where panning is to be frequently performed on the camera. In the second mode, when an acceleration (angular acceleration) in one direction is detected for a prescribed period of time by the vibration detecting means 39, the image-shake correction driving action for the same direction is not performed according to the period of time detected by the vibration detecting means 39. The third mode is a mode of control suited for a case where a mono-pod or tripod is used in taking a photograph. In the third mode, only image shake in the direction of yawing is corrected, while image shake in the direction of pitching is corrected only when caused by a shutter operating shock during the release operation.

When an electrical signal is output from the vibration detecting means 39 with some vibration detected, the electrical signal is transmitted to the circuit mounting board 38. Then, the information carried by the electrical signal is transmitted by the flexible circuit board to the image-shake correction optical means 37. As a result, the fifth lens unit L5 is driven and moved by the image-shake correction optical means 37 in the direction perpendicular to the optical axis in such a way as to correct the vibration applied to the lens barrel, for example, by the hand of the camera operator.

Figure 3:
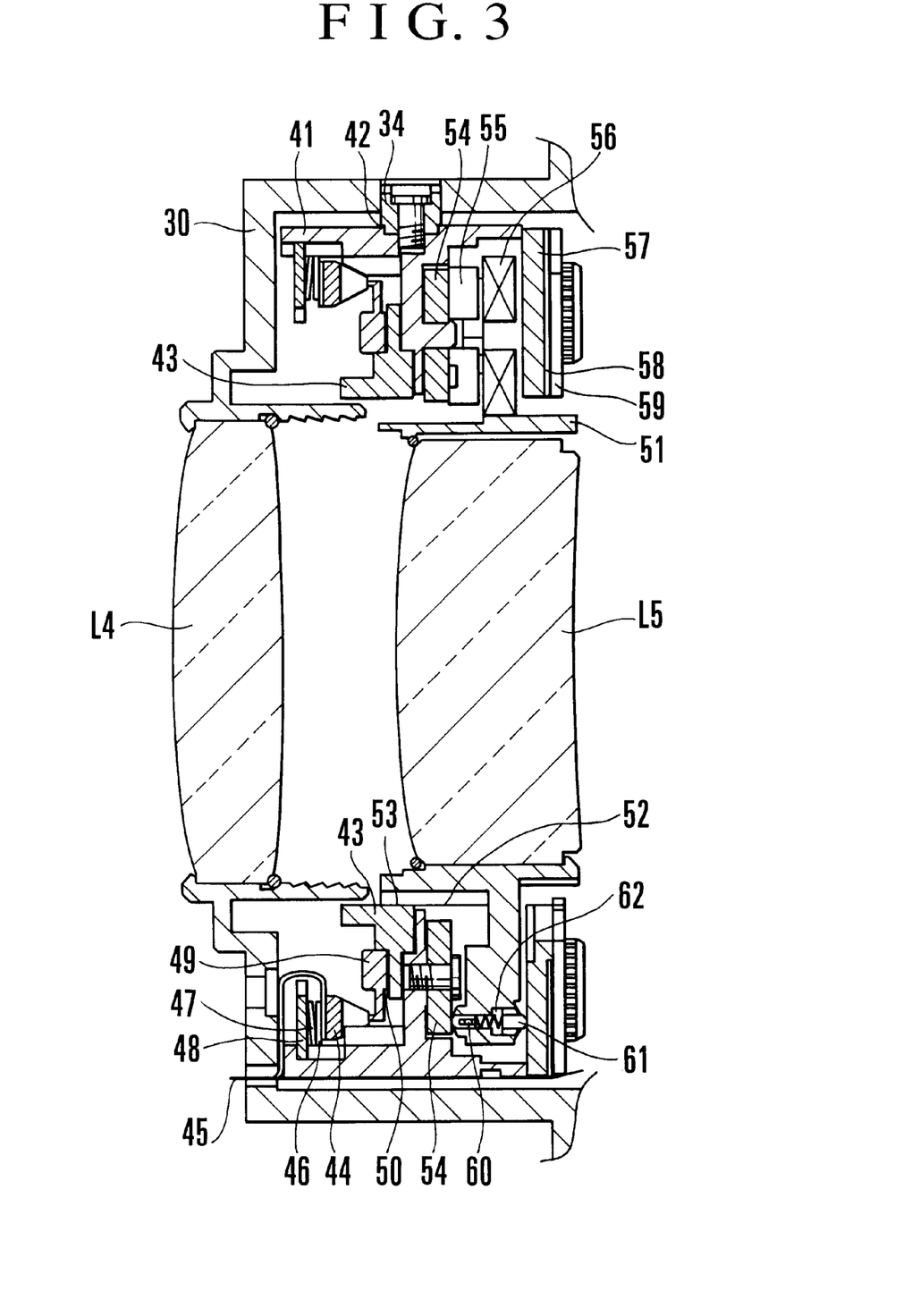
FIG. 3 is a sectional view showing an image-shake correction optical means included in the lens barrel shown in FIG. 1.

FIG. 3 shows the arrangement of the image-shake correction optical means 37. The roller 34 is fitted in a hole 42 formed on the outer circumferential side of a base plate 41. The base plate 41 is supported by the joining tube 30 with the roller 34 entering a hole part of the joining tube 30. A lock ring 43 is fitted on a stepped part of the base plate 41 and is rotatable in that state. A stator 44 has an electrostrictive element 46 stuck thereto between the stator 44 and the flexible circuit board 45 and is urged toward the lock ring 43 by a retaining plate 48 through a front spring washer 47. The retaining plate 48 has three projections on its outer side and is fixed in position by bayonet coupling. A rotor 49 of an ultrasonic motor and a rubber ring 50 are mounted rear of the stator 44.

The holding frame 51 which holds the fifth lens unit L5 has projections 52 radially arranged at three parts of the holding frame 51. With the holding frame 51 in a locked state, fore ends of the projections 52 are fittingly engaging the inner circumferential face 53 of the lock ring 43. In locking or unlocking, a voltage is applied to the electrostrictive element 46 from the circuit mounting board 38 through the flexible circuit board 45. With the voltage thus applied, the fore end of the stator 44 comes to oscillate to cause the rotor 49 to rotate. The rotation of the rotor 49 then causes through the rubber ring 50 the lock ring 43 to rotate. The locked or unlocked state is arranged to be retained by the urging force of the retaining plate 48 and the spring washer 47, that is, by virtue of a self-holding force of the ultrasonic motor. Therefore, no electric energy is consumed for retaining the locked or unlocked state. The art relative to this arrangement is disclosed in detail in Japanese Patent Application No. HEI 8-309426 by the assignee of the invention.

A magnetic body 54 is a second yoke to which bright electro-plating is applied. A permanent magnet 55 which is a neodymium magnet or the like (a shift magnet) is magnetically attracted by the second yoke 54. The holding frame 51 to which the fifth lens unit L5 is secured by means of a C ring or the like has a shift coil 56 attached thereto. Although it is not shown, the permanent magnet 55 and the coil 56 are arranged to orthogonally intersect the holding frame 51 at two parts in the pitching and yawing directions.

The surface of a first yoke 57 is coated with an insulating sheet 58. A hard base plate 59 on which a plurality of ICs and a PSD for detecting the position of the holding frame 51 are mounted is connected to the first yoke 57 with a screw which is not shown. The flexible circuit board 45 which is provided for signal transmission is attached to the hard base plate 59 by thermocompression bonding.

A pair of arm parts extend from the flexible circuit board 45 in the direction of a plane orthogonally intersecting the optical axis. The fore end of each of the arm parts is connected to the coil 56 and an LED which is fixedly connected to the holding frame 51. A spring 62 is arranged between support balls 60 and 61. These parts 60, 61 and 62 push the holding frame 51 toward the first yoke 57 to prevent the holding frame 51 from moving in the optical axis direction.

The image-shake correction optical means 37 is arranged to operate in the same manner as the conventional arrangement, as shown in FIG. 6, to move the lens in the vertical and horizontal directions indicated by arrows. Since the actions of the image-shake correction optical means 37 are thus known, the details of its actions are omitted from the following description.

Figure 4:
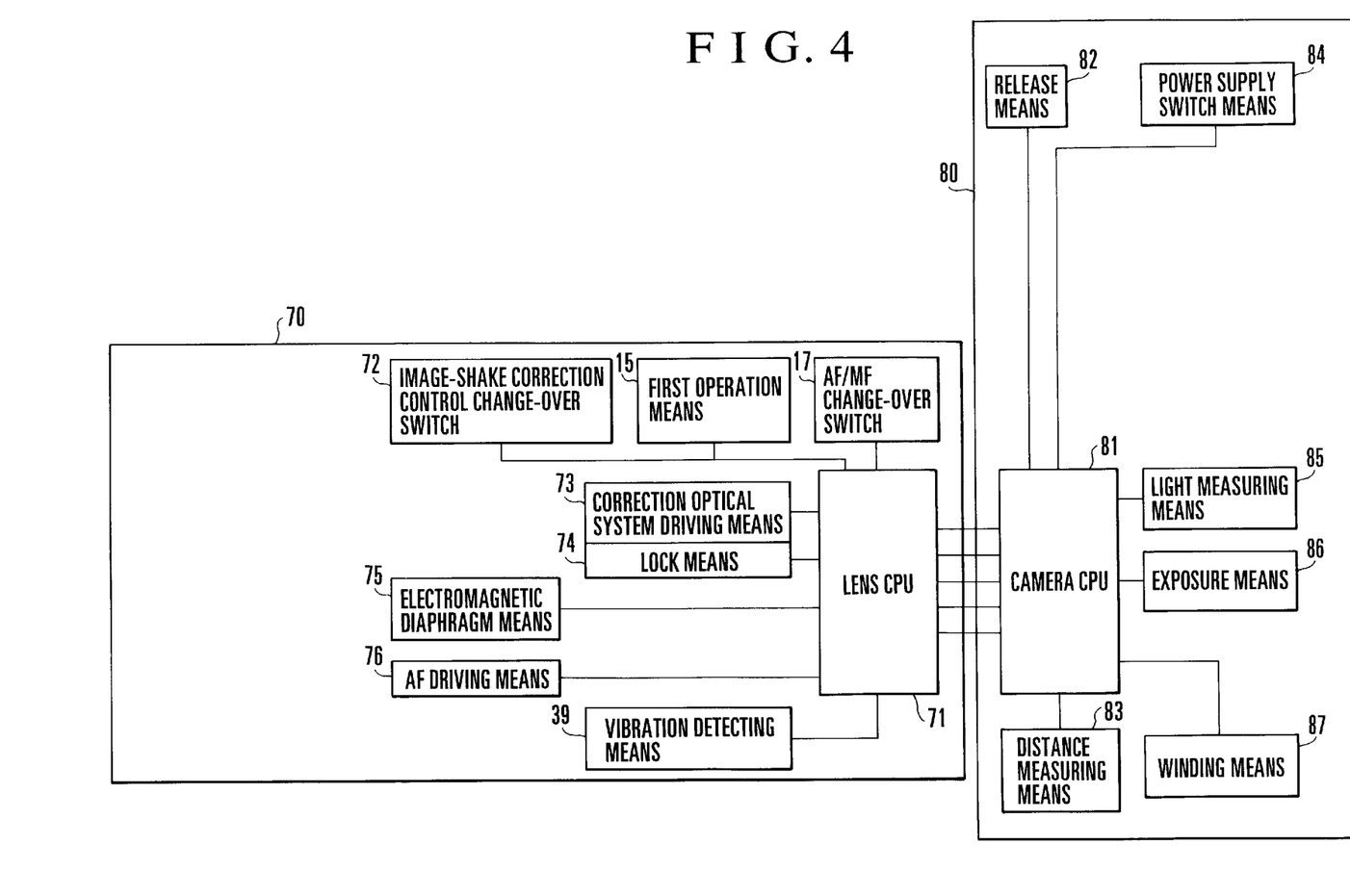
FIG. 4 is a block diagram showing the arrangement of circuits disposed in the lens barrel shown in FIG. 1 and also in a single-lens flex camera body.

FIG. 4 is a block diagram showing the circuit arrangement of the lens barrel shown in FIG. 1 and the circuit arrangement of the single-lens reflex camera body. A lens CPU 71 is disposed within the lens barrel 70. To the lens CPU 71 are connected the first operation means 15, the AF/MF change-over switch 17 which is arranged to output AF/MF section signals, and an image-shake correction control change-over switch 72 which is provided for selecting one of the three different modes of control over image-shake correction driving by switching one mode over to another. Further, to the lens CPU 71 are connected the outputs of various parts including a correction optical system driving means 73 of the correction optical means 37, a lock means 74 of the correction optical system, an electromagnetic diaphragm means 75 for aperture control, an AF driving means 76 for driving the third lens unit L3, and the vibration detecting means 39 which is arranged to detect vibrations of the lens barrel 70.

A camera CPU 81 is disposed within the single-lens reflex camera body 80. To the camera CPU 81 are connected the outputs of various parts including a release means 82 which is composed of a two-step switch, a distance measuring means 83 which is arranged to measure a distance to the object of shooting, a power supply switch means 84 for starting the camera CPU 81, a light measuring means 85 for measuring light, an exposure means 86 arranged to move a mirror up and to drive a shutter, and a winding means 87 for winding film. The camera CPU 81 is arranged to conduct communication with the lens CPU 71 through the electric contact block 20.

Figure 5:
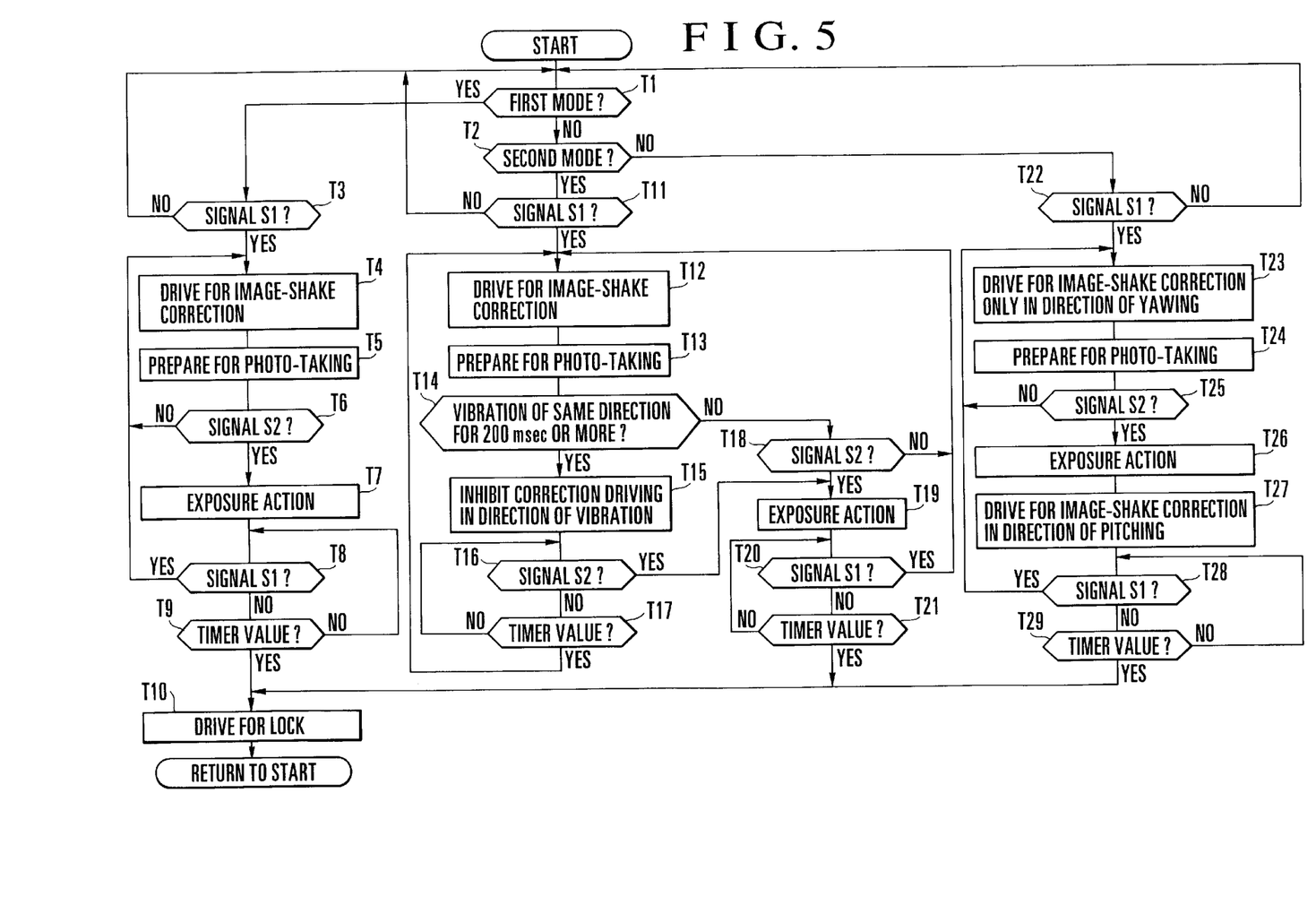
FIG. 5 is a flow chart showing image-shake correcting actions in the embodiment of the invention.

FIG. 5 is a flow chart showing a control operation to be performed in each of the control modes selectable by the second operation means 16. The flow of operation starts when the power supply switch means 84 is turned on. At steps T1 and T2 of the flow, a selected position of the second operation means 16 which is provided for the control mode selection is detected. The flow then proceeds to a step T3, to a step T11 or to a step T22 according to the selected position detected. If it is the first mode that is selected, the flow proceeds to the step T3. At the step T3, a check is made for a signal S1 output by the first step operation of the release means 82. If the signal S1 is found, the flow proceeds to a step T4. If not, the flow returns to the step T1.

At the step T4, the lock means 74 is released from locking, and the image-shake correction optical system driving means 73 is caused to start performing an image-shake correction driving action according to a signal coming from the vibration detecting means 39. At a step T5, the light measuring means 85 is caused to measure the light of the object. The distance measuring means 83 is caused to measure the distance to the object. The results of these measuring actions are transmitted to the AF driving means 76 through the camera CPU 81 and the lens CPU 71. The AF driving means 76 then performs a focusing action in preparation for a photo-taking operation.

At the next step T6, a check is made for a signal S2 output by the second step operation of the release means 82. If the signal S2 is found, the flow proceeds to a step T7. If not, the flow returns to the step T4. At the step T7, the exposure means 86 is caused to carry out a series of release actions. After completion of the photo-taking operation, the winding means 87 is caused to wind up the film. At a step T8, a check is made again for the signal S1. If the signal S1 is found, the flow returns to the step T4. If not, the flow proceeds to a step T9. At the step T9, a check is made for the count value of a timer which is arranged to start a time count after completion of the series of release actions mentioned above. In other words, the check is made to find if a prescribed period of time of, for example, one second, has elapsed. If not, the flow returns to the step T8. If so, the flow proceeds to a step T10. At the step T10, the correction optical system driving means 73 is caused to stop driving for image-shake correction. The lock means 74 is then caused to lock the image-shake correction optical means 37.

In a case where the second mode is selected, the flow proceeds to the step T11. At the step T11, a check is made for the signal S1 in the same manner as the step T3. If the signal S1 is found, the flow proceeds to a step T12. If not, the flow returns to the step T1. At the step T12, the lock means 74 is released from locking in the same manner as the step T4. The image-shake correction optical system driving means 73 is caused to start driving for image-shake correction. At a step T13, the preparatory actions before photo-taking are carried out in the same manner as the step T5. At a step T14, a check is made to find if the vibration detecting means 39 has any input indicating a vibration to an angle of, for example, at least 0.2 degree and continuing in the same direction for a period of 200 msec or more. If so, the camera operator is determined to be performing panning, and the flow proceeds to a step T15. At the step T15, driving for image-shake correction in the direction of the input (vibration) detected at the step T14 is inhibited.

At a step T16, a check is made for the signal S2. If the signal S2 is found, the flow proceeds to a step T19. If not, the flow proceeds to a step T17. At the step T17, the count value of a timer which has started a time count from the point of time when driving for image-shake correction is inhibited is checked to find if a prescribed period of time of, for example, 2 sec, has elapsed. If not, the flow returns to the step T16. If so, the flow returns to the step T12. The inhibiting time is thus set according to the length of time of the panning action.

If no input indicating a vibration of the same direction for 200 msec or more is found at the step T14, the flow proceeds to a step T18. At the step T18, a check is made for the signal S2. If the signal S2 is found, the flow proceeds to a step T19. If not, the flow returns to the step T12. At the step T19, the exposure action is performed in the same manner as the step T7. At a step T20, a check is made for the signal S1. If the signal S1 is found, the flow returns to the step T12. If not, the flow proceeds to a step T21. At the step T21, the count value of the timer is checked in the same manner as the step T9 to find if the prescribed period of time has elapsed. If not, the flow returns to the step T20. If so, the flow proceeds to the step T10.

In a case where the third mode is selected, the flow proceeds to the step T22. At the step T22, a check is made for the signal S1. If the signal S1 is found, the flow proceeds to a step T23. If not, the flow returns to the step T1. At the step T23, the driving action for image-shake correction is performed only for vibrations in the direction of yawing according to the output of the vibration detecting means 39. At a step T24, the preparatory actions before photo-taking are performed in the same manner as the steps T5 and T13.

At a step T25, a check is made for the signal S2. If the signal S2 is found, the flow proceeds to a step T26. If not, the flow returns to the step T23. At the step T26, the exposure action is performed in the same manner as the steps T7 and T19. At a step T27, the driving action for image-shake correction is performed also for vibrations occurring in the direction of pitching only during the process of the exposure action of the step T26. At a step T28, a check is made for the signal S1. If the signal S1 is found, the flow returns to the step T23. If not, the flow proceeds to a step T29. At the step T29, the count value of the timer is checked to find if the prescribed period of time has elapsed, in the same manner as the steps T9 and T21. If so, the flow proceeds to the step T10. If not, the flow returns to the step T28. At the step T10, the lock means 74 is driven and, after that, the flow returns to the start.

In carrying out the invention, the numerical values mentioned in the foregoing description of the embodiment may be changed to some other suitable values. The invention applies also to a lens barrel other than a lens barrel adapted for a single-lens reflex camera.

As described above, a lens barrel having an image-shake correction optical means is arranged, according to the invention, to have a plurality of driving control patterns (modes) for control over the image-shake correction optical means, and to have an operation means arranged on an outer circumferential side of the lens barrel to permit switching of the control patterns (modes) from one pattern over to another as desired by the camera operator. The arrangement can effectively broaden the range of photo-taking opportunities.

Further, a lens barrel having an image-shake correction optical means according to the invention is provided not only with a plurality of driving control patterns (modes) for control over the image-shake correction optical means but also with a first operation means which is arranged at an outer circumferential part of the lens barrel to be slidable in parallel with the optical axis for turning on and off the action of the image-shake correction optical means, and a second operation means which is arranged also at an outer circumferential part of the lens barrel to be slidable in parallel with the first operation means for switching (change-over) of the above-stated patterns (modes) of driving control over the image-shake correction optical means from one pattern over to another. These operation means are thus arranged to eliminate the possibility of an erroneous operation by the operator, so that pictures can be taken without missing photo-taking opportunities.

Further, a lens barrel having an image-shake correction optical means according to the present invention is arranged not only to have a normal mode of driving for image-shake correction but also to enable the operator to select another mode in which a backward image shake taking place in panning can be made less conspicuous.

Further, in addition to a normal mode of driving for image-shake correction, a lens barrel having an image-shake correction optical means according to the present invention is arranged to have a further selectable mode in which the image-shake correction optical means is driven for correction of vibrations taking place only in the direction of yawing and is driven in the direction of pitching only when a vibration is caused by a shutter operating shock. Therefore, in a case where a tripod is used, the selection of this further mode improves the display state of a viewfinder and, since the image-shake correction optical means can be driven for image-shake correction also in the direction of pitching at the time of an exposure, a picture can be taken without any image shake.

We claim:

1. A lens barrel having an optical axis and an image stabilizing function, said lens barrel comprising:

vibration detecting means for detecting a vibration and outputting a vibration detection signal;

optical means for correcting an image shake by changing an optical path according to the vibration detection signal output by said vibration detecting means;

driving means for driving said optical means, said driving means having a plurality of driving control modes; and setting means, slidable in a direction of the optical axis, for selectively setting said driving means in one of the plurality of driving control modes.

2. A lens barrel according to claim 1, further comprising an operation member for causing said driving means to start and stop driving said optical means.

3. A lens barrel according to claim 2, wherein said setting means and said operation member are arranged separately from each other.

4. A lens barrel according to claim 1, wherein said optical means is a lens unit and said driving means drives said optical means in a direction perpendicular to the optical axis of said lens barrel.

5. A lens barrel according to claim 2, wherein said operation member is slidable in a direction of the optical axis.

6. A lens barrel according to claim 1, wherein said plurality of driving control modes include a first mode in which different driving control operations are performed respectively for a vibration occurring in a predetermined direction and a vibration occurring in a direction different from the predetermined direction, and a second mode in which driving control operations performed respectively for a vibration occurring in the predetermined direction and a vibration occurring in the direction different from the predetermined direction are not different.

7. A lens barrel according to claim 6, wherein the first mode inhibits said driving means from performing a driving control operation for a vibration occurring in the predetermined direction.

8. A lens barrel having an optical axis and an image-shake preventing function, the lens barrel comprising:

image-shake detecting means for detecting image shake and outputting a detection signal, optical means for correcting image shake by changing an optical path according to the detection signal of said image-shake detecting means, driving means for driving the optical means, said driving means having plural different drive control modes, mode setting means for outputting a mode setting signal for selectively setting said driving means in one of the plural different drive control modes, and drive state setting means for outputting a state setting signal for setting the driving means in a driving state or in a non-driving state, wherein the optical means is driven by said driving means on the basis of the detection signal of the image-shake detecting means, the mode setting signal of the mode setting means, and the drive state setting signal of the drive state setting means.

9. A lens barrel according to claim 8, wherein the mode setting means and the drive state setting means are provided at different locations.

10. A lens barrel according to claim 8, wherein each of the mode setting means and the drive state setting means is slidable in a direction of the optical axis of the barrel.

* * * * *

UNITED STATES PATENT AND TRADEMARK OFFICE
CERTIFICATE OF CORRECTION

PATENT NO. : 6,035,134

DATED : March 7, 2000

INVENTOR(S): SHIGEKI SATO, ET AL.

It is certified that error appears in the above-identified patent and that said Letters Patent is hereby corrected as shown below:

Column 1

Line 15, "focus" should read --auto-focus--.
    Line 16, "auto-control," should read --control,--.

Column 3

Line 54, "flex" should read --reflex--.

Signed and Sealed this

Twentieth Day of March, 2001

Attest:

NICHOLAS P. GODICI

*Attesting Officer*      *Acting Director of the United States Patent and Trademark Office*